(12) United States Patent
Webber et al.

(10) Patent No.: US 7,240,405 B2
(45) Date of Patent: Jul. 10, 2007

(54) DEVICE AND METHODS FOR ADJUSTING SEAT BELT WEBBING TENSION

(75) Inventors: James L. Webber, Shelby Township, MI (US); Michael T. Moury, Shelby Township, MI (US); David G. Hlavaty, Northville Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 68 days.

(21) Appl. No.: 11/156,050

(22) Filed: Jun. 17, 2005

(65) Prior Publication Data

US 2006/0282992 A1    Dec. 21, 2006

(51) Int. Cl.
*A44B 11/10* (2006.01)
(52) U.S. Cl. .......................................... 24/171; 24/194
(58) Field of Classification Search ...................... None
See application file for complete search history.

(56) References Cited

U.S. PATENT DOCUMENTS

| | | | |
|---|---|---|---|
| 2,028,530 A * | 1/1936 | Steiner ........................ | 24/194 |
| 2,569,750 A * | 10/1951 | Dillenz ........................ | 24/194 |
| 3,879,810 A * | 4/1975 | Prete et al. ................... | 24/194 |
| 4,516,576 A * | 5/1985 | Kirchner ....................... | 24/171 |
| 4,726,625 A | 2/1988 | Bougher ........................ | 297/483 |
| 5,350,196 A | 9/1994 | Atkins ......................... | 280/808 |
| 5,471,714 A * | 12/1995 | Olson .......................... | 24/171 |
| 5,495,646 A | 3/1996 | Scrutchfield et al. ......... | 24/500 |
| 5,649,341 A * | 7/1997 | Ashline et al. ............... | 24/171 |
| 5,653,003 A | 8/1997 | Freeman ....................... | 24/543 |
| 6,065,777 A | 5/2000 | Merrick ........................ | 280/804 |
| 6,312,015 B1 | 11/2001 | Merrick et al. ............. | 280/804 |
| 6,588,068 B1 * | 7/2003 | Wang .......................... | 24/171 |

\* cited by examiner

*Primary Examiner*—Robert J. Sandy
(74) *Attorney, Agent, or Firm*—Douglas D. Fekete (57) ABSTRACT

A seat belt device for adjusting the tension of a seat belt webbing drawn across a user's body when the seat belt is in a latched condition, the seat belt device comprising: a housing defining a receiving area configured to slidably receive the seat belt webbing therethrough; a clamp member slidably mounted to the housing, the clamp member being configured for movement between a first position and a second position, wherein a clamping surface of the clamp member urges a portion of the seat belt webbing against an engagement portion of the housing when the clamp member is in the first position, the engagement portion being included in the receiving area; and a biasing member being configured to urge the clamp surface toward the engagement portion.

26 Claims, 9 Drawing Sheets

$$F_{webbing} = F_{spring} / \tan \alpha = 6 \text{ N} / \tan(3.5°)$$

$$F_{webbing} = 98 \text{ N} \quad \leftarrow \text{Theoretical Maximum} - \text{disregards frictional losses}$$

DEVICE AND METHODS FOR ADJUSTING SEAT BELT WEBBING TENSION

TECHNICAL FIELD

This application relates to a device and a method for adjusting the tension in seat belt webbing in a latched condition.

BACKGROUND

Vehicles are equipped with seat belts wherein a seat belt is drawn across the occupant's body and secured to a buckle, which is fixedly secured to the vehicle. In a latched condition, when the seat belt is secured to the buckle, a portion of the webbing is drawn across and contacts a portion of the user's body. Some vehicle seat belt systems also have a webbing retraction mechanism that retracts the webbing inducing a predetermined amount of tension into the webbing when the seat belt is in a latched condition. This initial tension keeps the webbing close to the user's body.

In addition, vehicle seat belt systems also include a locking mechanism that locks the webbing from further unwinding when a predetermined condition is sensed (e.g. deceleration of the vehicle or abrupt tugging on the belt). Although tension in the webbing is desirable, it can result in unwanted rubbing of the webbing against the user's body due to vibration encountered during operation of the vehicle, especially when the webbing has been locked from further unwinding. For example, vehicles such as trucks with stiff suspensions experience a rougher ride than most passenger vehicles. Consequently, the constant rubbing of the webbing against a user's body can wear the user's clothes or otherwise be quite annoying. In addition, the locked webbing prevents the user from leaning forward or making other relatively close movements. Therefore, it is desirable to provide the user with a means to quickly introduce an amount of looseness or slack into the webbing drawn across his or her body. Additionally, it is also desirable to provide a device that can be releasably secured to the webbing but does not wear or damage the webbing or otherwise compromise the intended performance of the webbing in securing the user to the vehicle seat. In addition, it is also desirable to provide an apparatus that will not interfere with the operation of a pretensioner secured to the seat belt webbing or seat belt buckle to which the webbing is coupled.

Accordingly, it is desirable to provide an apparatus and method for adjustably providing a desirable amount of looseness or slack in the webbing drawn across the user while the seat belt is in a latched condition.

SUMMARY OF THE INVENTION

The present invention relates to devices and methods for adjusting the tension of seat belt webbing drawn across a body of a vehicle occupant.

A seat belt device for adjusting the tension of a seat belt webbing drawn across a user's body when the seat belt is in a latched condition, the seat belt device comprising: a housing defining a receiving area configured to slidably receive the seat belt webbing therethrough; a clamp member slidably mounted to the housing, the clamp member being configured for movement between a first position and a second position, wherein a clamping surface of the clamp member urges a portion of the seat belt webbing against an engagement portion of the housing when the clamp member is in the first position, the engagement portion being included in the receiving area; and a biasing member being configured to urge the clamp surface toward the engagement portion.

A seat belt restraint system, comprising: a seat belt webbing secured to a seat belt retractor at one end and a seat belt buckle at the other end; a device for adjusting the tension of the seat belt webbing after it has been drawn across a user's body and secured to the seat belt buckle, the device comprising: a housing defining a receiving area configured to slidably receive the seat belt webbing therethrough; a clamp member slidably mounted to the housing, the clamp member being configured for movement between a first position and a second position, wherein a clamping surface of the clamp member urges a portion of the seat belt webbing against an engagement portion of the housing when the clamp member is in the first position, the engagement portion being included in the receiving area; and a biasing member being configured to urge the clamp surface toward the engagement portion.

A method for providing an amount of slack in a seat belt webbing of a seat belt system, comprising: introducing a desired amount of slack in the seat belt webbing; positioning a device about the seat belt webbing proximate a guide member for the seat belt webbing, the guide member being configured to allow the seat belt webbing to slid therethrough and the guide member being fixedly secured in its location, wherein the device comprises a housing defining a receiving area configured to slidably receive the seat belt webbing therethrough; a clamp member slidably mounted to the housing, the clamp member being configured for movement between a first position and a second position, wherein a clamping surface of the clamp member urges a portion of the seat belt webbing against an engagement portion of the housing when the clamp member is in the first position, the engagement portion being included in the receiving area; and a biasing member being configured to urge the clamp surface toward the engagement portion; and clamping the device about the seat belt webbing proximate to the guide member wherein when the device prevents the webbing from passing through the guide member.

DETAILED DESCRIPTION OF EXEMPLARY EMBODIMENTS

This application relates to devices and methods for adjusting the tension of seat belt webbing drawn across and contacting a portion of the user's body after the user has secured the seat belt in a latched condition. More particularly, exemplary embodiments are directed to devices configured to allow the user to introduce a desired amount of looseness or slack into the webbing across the user's body. Exemplary embodiments are directed to devices configured to allow the user to adjust the tension of the webbing by easily changing the position of the device on the webbing across his body.

Referring now to FIGS. 1–6, an exemplary embodiment of the present invention is illustrated. Illustrated in FIGS. 1 and 2 a device 10 is configured to be disposed on a section of webbing 12 between a turning loop or mounting ring (e.g., "D-ring") 14 and a seat belt buckle 16. Typically, a seat belt is in a latched condition when a tongue connected to webbing 12 securably connects to the seat belt buckle 16. Mounting ring 14 includes an opening 18 configured to aid in positioning and guiding webbing 12 to contact a specific portion of a user's body in a flat orientation. The portion of webbing 12 between the mounting ring 14 and the buckle 16 is typically drawn across a portion of the user's body when he is disposed on a vehicle seat with the seat belt in the latched condition.

Figure 1:
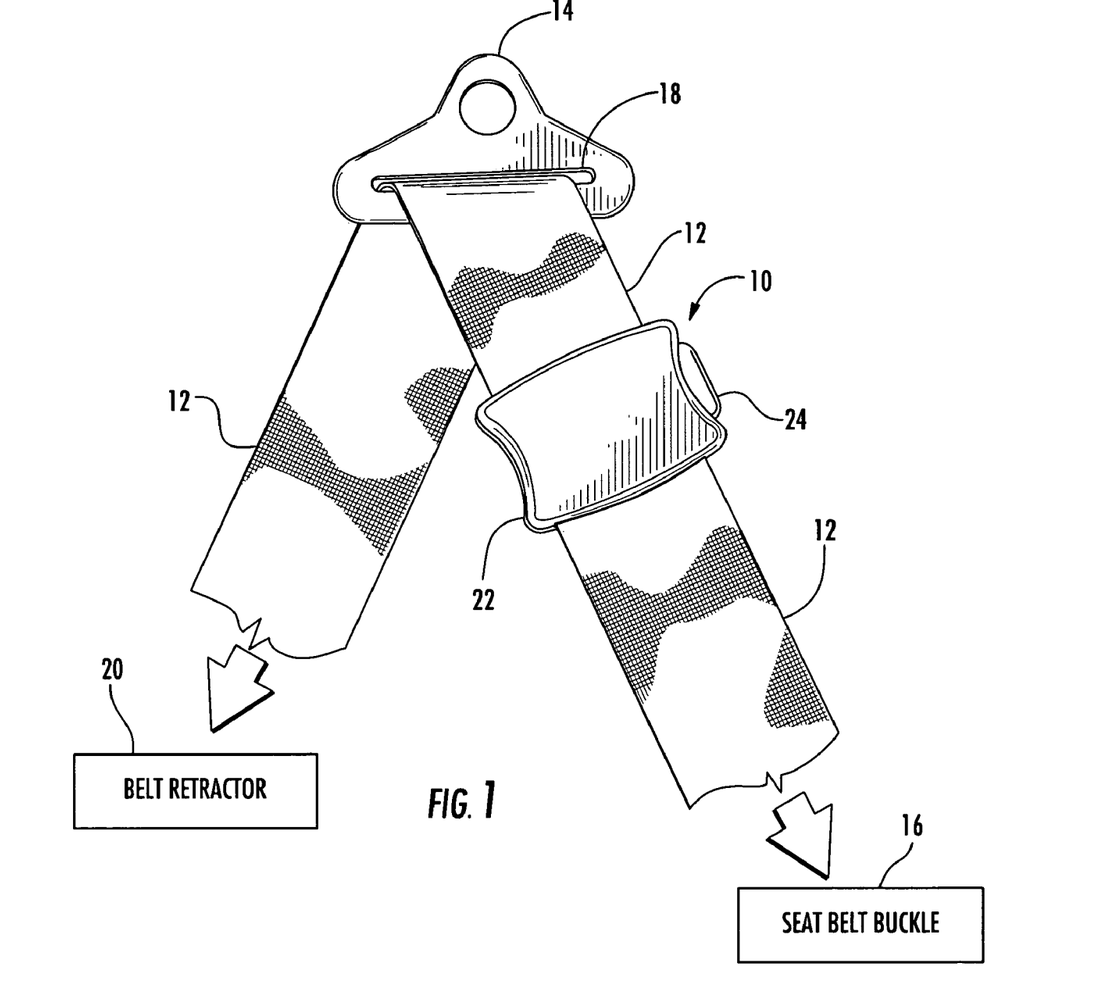
FIG. 1 is a view of a webbing tension-reducing device installed on seat belt webbing in accordance with an exemplary embodiment of the present invention.
Figure 2:
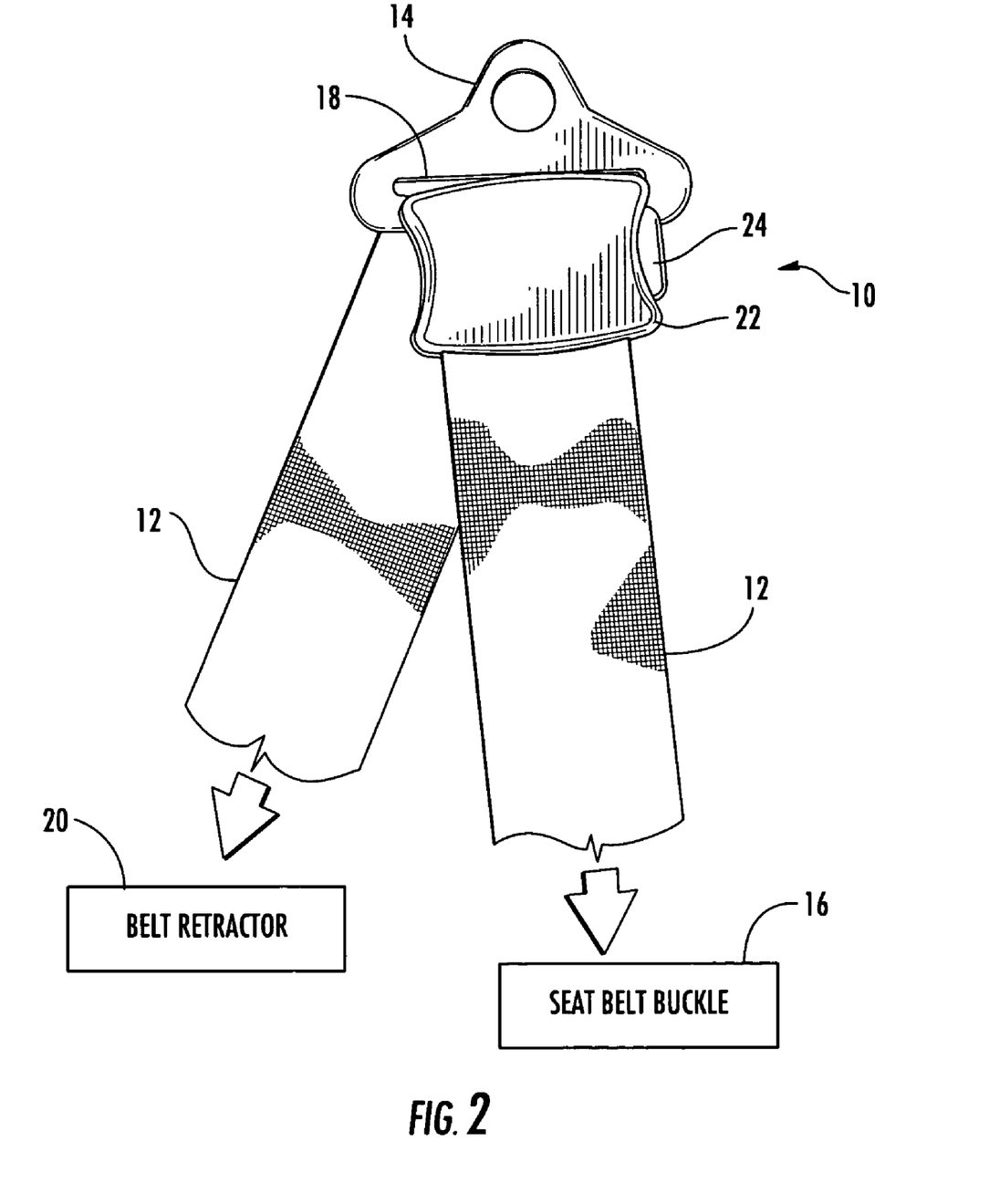
FIG. 2 is a view of the device of FIG. 1 installed on seat belt webbing and abutting a turning loop.

A retractor mechanism 20 provides tension to roll or take up portions of webbing 12. When the user is not using the seat belt, retractor 20 recoils a portion of webbing 12 or stows the section of webbing 12 between the mounting ring 14 and buckle 16 closer to the vehicle door or other structure. In the latched condition, retractor 20 recoils webbing 12 to induce a predetermined amount of tension into the section of webbing 12 from the retractor 20 to buckle 16. This initial tension keeps webbing 12 close to the user's body. Retractor 20 is also activated via sensors to lock webbing 12 from further unwinding from the retractor 20 when a predetermined condition is sensed (e.g. deceleration of the vehicle or abrupt tugging on the webbing). Although tension in webbing 12 is desirable, it can result in unwanted rubbing of webbing 12 against the user's body due to vibration encountered during operation of the vehicle, especially when the webbing has been locked from further unwinding. In addition, locked webbing prevents the user from leaning forward or making other relatively close movements. Thus, device 10 provides the user with a means to introduce looseness into webbing 12 by adjusting the position of device 10 along webbing 12 between the mounting ring 14 and seat belt buckle 16, as illustrated in FIGS. 1 and 2. Once positioned on the webbing, the device will prevent further retraction of the seat belt webbing through the opening in the "D-ring".

Figure 3:
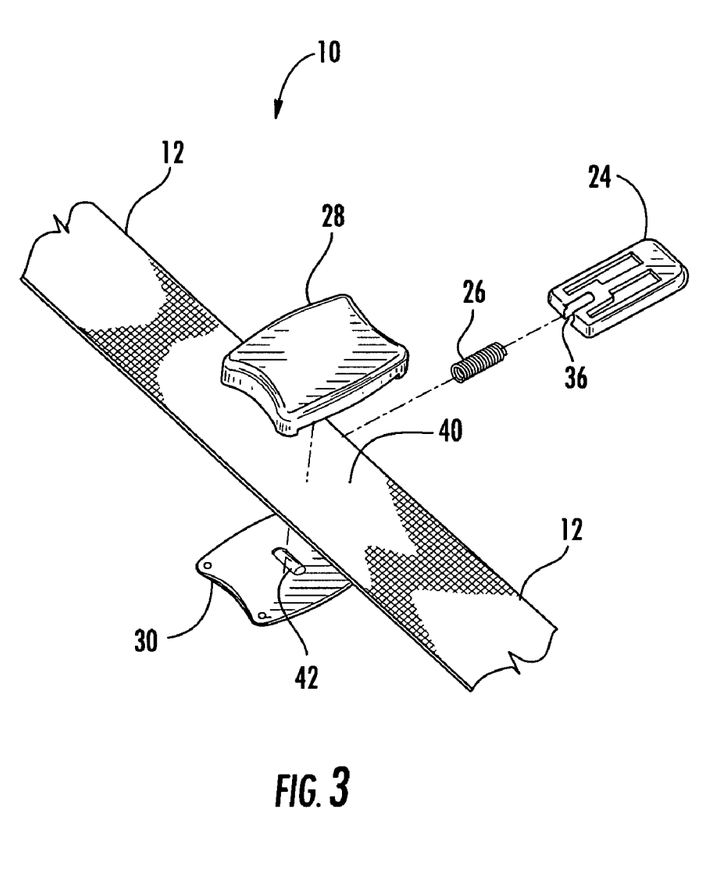
FIG. 3 is an exploded perspective view of a device constructed in accordance with an exemplary embodiment of the present invention.
Figure 4:
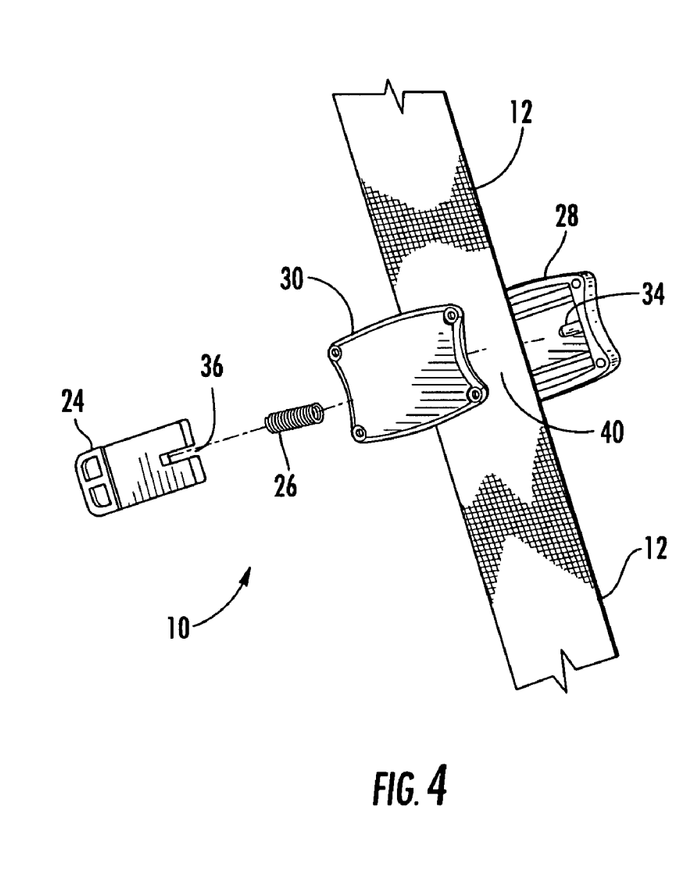
FIG. 4 is another exploded perspective view of the device of FIG. 3.
Figure 5:
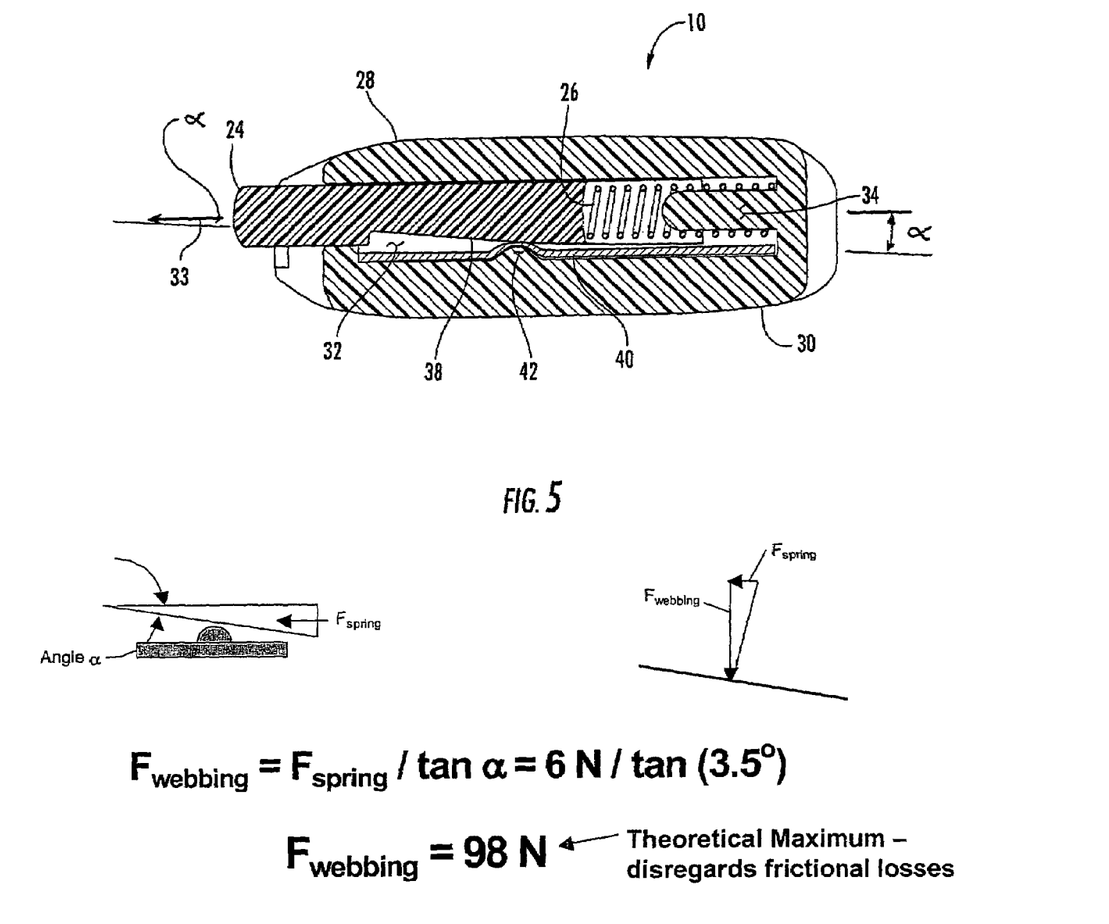
FIG. 5 is a cross-sectional view of a device constructed in accordance with an exemplary embodiment of the present invention illustrating an operating position.

Referring now to FIGS. 3–5, exemplary embodiments of device 10 are illustrated. Device 10 comprises a housing 22, a clamp member 24, and a biasing member or spring 26. In this embodiment, housing 22 comprises an upper housing portion 28 and a lower housing portion 30. As illustrated in FIG. 5, housing 22 is configured to include a receiving area 32. Receiving area 32 is configured to slidably receive clamp member 24 therein. Receiving area 32 is further configured to slidably receive webbing 12, wherein device 10 is configured to slidably move along the section of webbing 12 between the mounting ring 14 and buckle 16. In the exemplary embodiment illustrated in FIGS. 5 and 6, a section of webbing 12 is disposed in the receiving area 32 between clamp member 24 and an interior portion of lower housing 30.

In exemplary embodiments such as illustrated in FIGS. 3–6, biasing member 26 is configured to urge clamp member 24 in the direction of arrow 33. Here upper housing 28 includes a protrusion, shaft or stud 34 disposed within receiving area 32. Portion 34 is configured to receive and retain a portion of biasing member 26 thus allowing a biasing force to be applied to clamp member 24. As illustrated, clamp member 24 is configured to have a recess 36, which is also configured to receive and retain another portion of biasing member 26 as well as allow protrusion 34 to travel therein when a force is applied to clamp member 24 in a direction opposite to arrow 33, which overcomes and compresses biasing member 24.

Exemplary embodiments of housing 22 include forming housing 22 from a plurality of portions that when assembled define receiving area 32. An exemplary embodiment is illustrated in FIGS. 3–6 wherein housing 22 comprises an upper housing portion 28 and a lower housing portion 30. Exemplary embodiments of housing 22 include configurations where the housing portions are assembled together with fastening means such as screws or rivets. In other exemplary embodiments, the housing portions are configured to include features that allow the housing portions to fixedly connect together with a forced flexible interference fit, e.g., a snap-fit. These embodiments can include features configured to allow disassembly of the housing portions for future maintenance or replacement of parts or for attaching and removing the device from the seat belt webbing. For instance, flexible snap-fit features configured so a screwdriver can pry the housing portions apart without breaking the components and thereafter the housing portion can be snapped back together by hand.

An example of an exemplary embodiment where housing 22 is configured as a pair of portions is illustrated in FIGS. 8–16. Here, upper housing 28 and lower housing 30 are configured as molded components. In this embodiment, upper housing 28 and/or lower housing 30 include locking features comprising a plurality of shaped apertures 44 configured for securely receiving a plurality of protrusions or leg members 46. Leg members 46 and apertures 44 are configured so that some leg members slidably engage some apertures 44 or legs 46 while other leg members 46 are forced into or snap-fit into remaining apertures 44, thereby lockably coupling upper housing 28 to lower housing 30.

Figure 15:
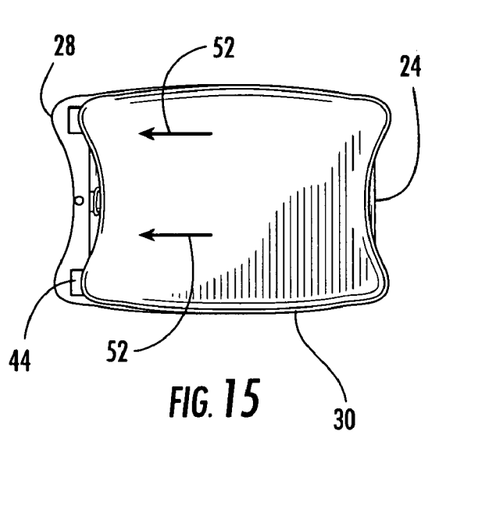

Alternative embodiments include configurations where leg members 46 and apertures 44 are configured to allow all leg members 46 to snap-fit into apertures 44. Leg members 46 and or aperture 44 surfaces can be configured to possess a degree of flexibility to permit their slight forced deflection and return to their original position after housing portions are connected. For example, a portion of the aperture is configured to receive a portion of the leg member while the housing portions are offset from each other (FIG. 15). Thereafter, the portions are slid together and the leg members are configured to engage features of the apertures. Thus, the two housing portions are engaged to each other and the same are easily secured to each other about webbing 12 thereby negating the need to slide the webbing through the receiving area. Of course, sliding the webbing through the receiving area provides an alternative means for placing device 10 on webbing 12. Additionally, this embodiment allows the separation of upper housing 28 from lower housing 30 for maintenance without breaking portions or other components by applying a small force, for example with a screwdriver, to dislodge leg members 46 from their respective apertures 44. In addition, this allows for the removal and replacement of housing 10 onto webbing 12.

Figure 16:
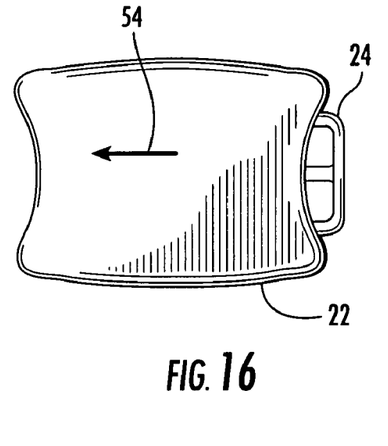

An example of an assembly process for an exemplary embodiment of device 10 is illustrated in FIGS. 11–16. First, biasing member or spring 26 is slidably disposed on protrusion 34 of upper housing 28 as illustrated in FIG. 20. Then clamp member 24 is slidably disposed within a receiving area 37 wherein biasing member 26 slidably engages recess 36 and a retaining tab depending away from a periphery of the clamp member is disposed in a slot of the upper housing. As illustrated in FIG. 15, lower housing 30 is then coupled to upper housing 28 where leg members 46 slidably engage respective apertures 44 (in the direction of arrows 52). FIG. 16 illustrates the assembled condition wherein clamp member 24 is moved to the unclamped condition by applying a force to clamp member 24 (in the direction of arrow 54).

Figure 7:
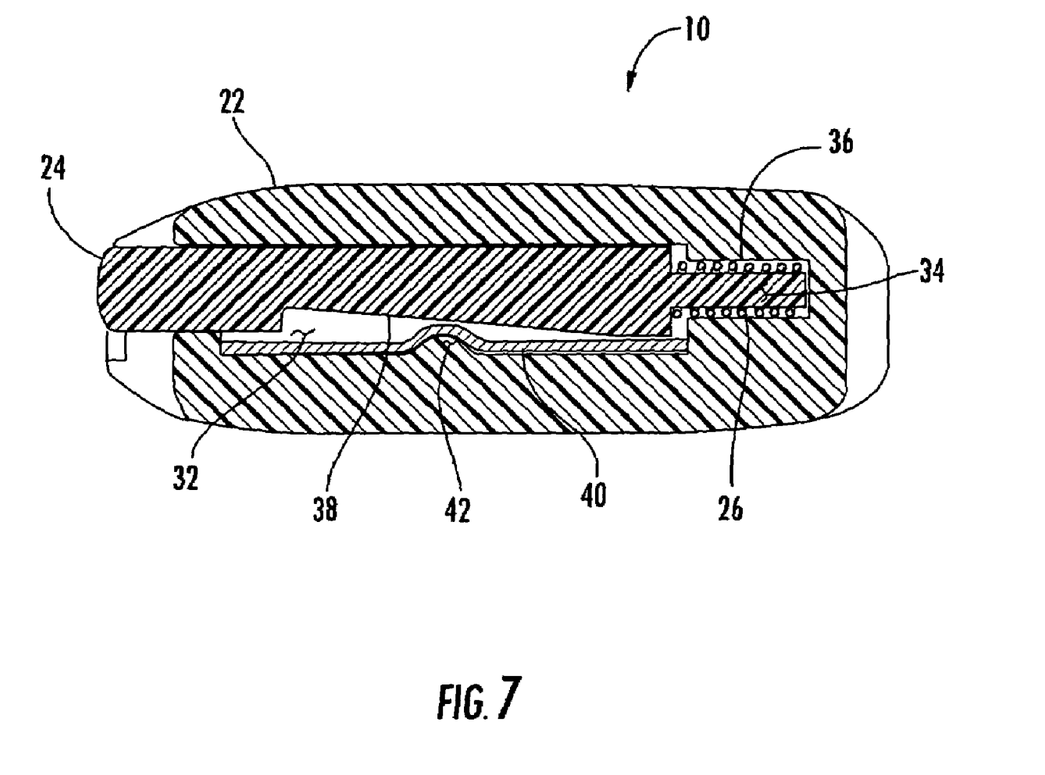
FIG. 7 is a cross-sectional view of another alternative exemplary embodiment of the present invention.
Figure 8:
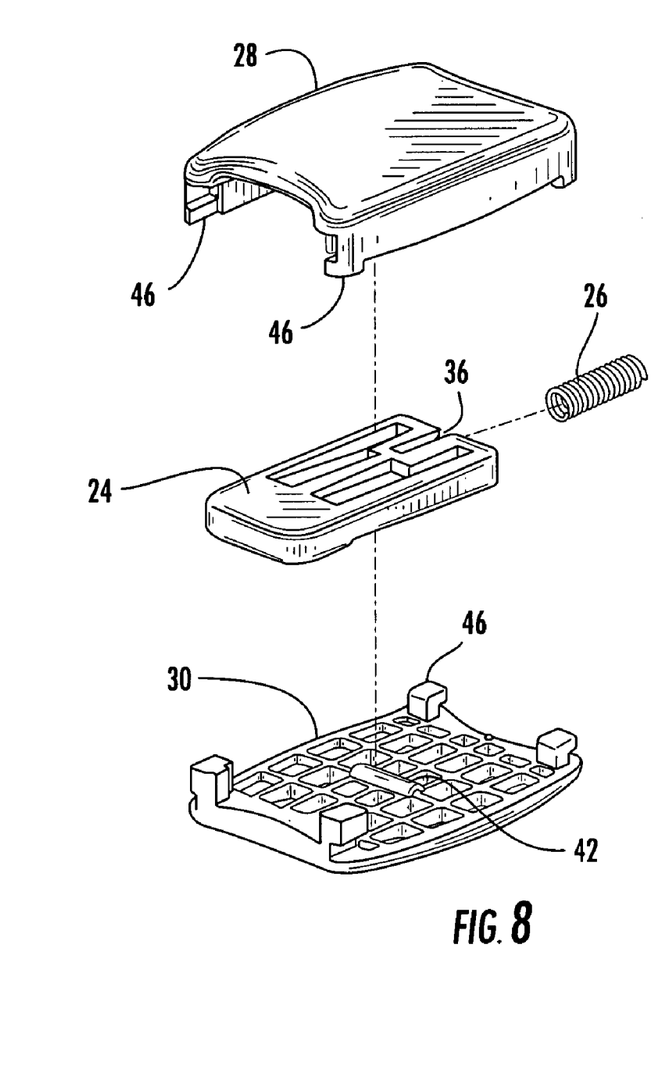
FIG. 8 is an exploded perspective view of a device constructed in accordance with an alternative exemplary embodiment of the present invention.
Figure 9:
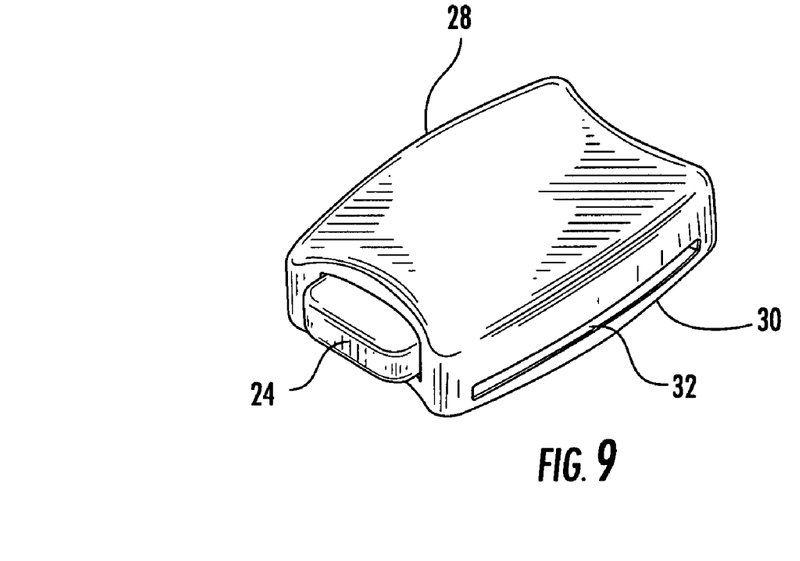
FIG. 9 is a perspective view of the assembled device of FIG. 8 constructed in accordance with an exemplary embodiment of the present invention.
Figure 10:
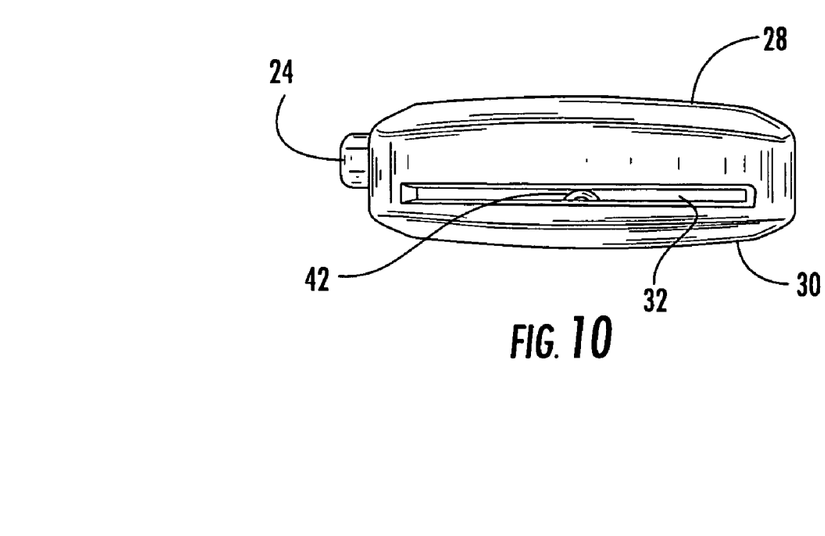
FIG. 10 is a side view of the assembled device of FIG. 9 constructed in accordance with an exemplary embodiment of the present invention.
Figure 11:
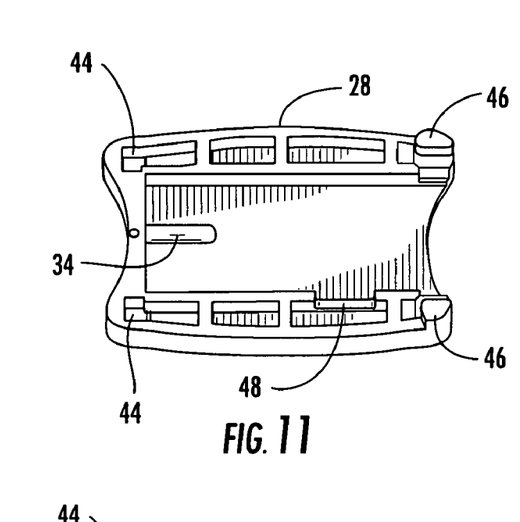
FIGS. 11–16 are views showing the assembly of a device constructed in accordance with an exemplary embodiment of the present invention.
Figure 12:
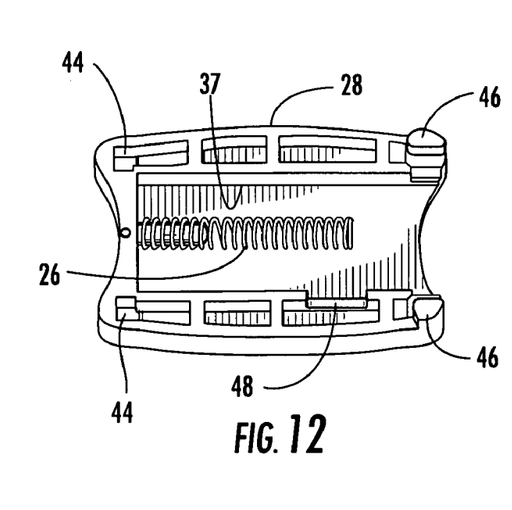

It is, of course, understood that alternative configurations of biasing member 24, clamp member 24 and housing 22 are contemplated in order to provide the biasing force to clamp member 24 and allow for slidable movement of clamp member 24 within housing 22. A non-limiting example is illustrated in FIG. 7, wherein the clamp member has a protrusion 34 and the housing is configured to have a recess 36 wherein the recess is configured to receive a portion of biasing member 26 and protrusion 34.

In an exemplary embodiment clamp member 24 further includes a clamp portion or contact surface 38 configured to contact a portion 40 of webbing 12, when it is disposed within receiving area 32. In an exemplary embodiment and as illustrated in FIG. 5, biasing member 26 urges clamp member 24 to a first operational position. At the first operational position, clamp portion 38 urges the webbing portion 40 against an engagement portion 42 of lower housing 30. At the first operational position, device 10 is disposed in a clamped condition at a location along webbing 12. The clamped condition occurs when webbing portion 40 is forcibly sandwiched between the clamp portion 38 and the engagement portion 42.

Clamping surface 38 is configured and positioned so that the clamping or sandwiching force upon webbing portion 40 is substantially higher than the urging force provided by biasing member 26. For instance, in the non-limiting embodiment illustrated in FIG. 5, clamping surface 38 is configured as a low angle wedge of approximately 3.5 degrees (angle α) relative to the line of force provided by the biasing member 26. In this exemplary embodiment, the low angle wedge results in a clamping force in excess of fifteen times the force provide by the biasing member. Consequently, the low angle permits use of biasing member 26 with a much lower biasing force to operate device 10 as described in the embodiments herein. If the angle increases, biasing member 26 having a higher biasing force is required to achieve the same clamping or sandwiching force upon webbing 40. Furthermore, an additional benefit of a low angle wedge is the ability to use smaller biasing member 26 having a relatively low biasing force thereby taking up less space in device 10. Of course, the angle may vary and be less than or greater than 3.5 degrees.

In the clamped condition, device 10 is secured to webbing portion 40, until the user applies a force to a portion of the clamp member protruding from the housing to move clamp member 24 in a direction opposite of arrow 33 and the biasing force of the biasing spring. Once the biasing force is overcome and clamp member 24 slides in a direction opposite of arrow 33, the clamp portion is moved away from the lower housing and protrusion 42 and the webbing is now free to slide within receiving area 32.

In exemplary embodiments, clamp portion 38 and engagement portion 42 are configured and positioned to aid in retaining device 10 in the clamped condition at a location on webbing 12. An example of the engagement of device 10 is illustrated in FIGS. 3, 5, and 6.

Engagement portion 42 is configured as a protrusion that extends from a portion of the lower housing 30 into receiving area 32 toward clamp member 24. Engagement portion 42 is shaped and positioned so that clamp portion 38 substantially urges webbing portion 40 against engagement portion 42 in the clamped condition. As illustrated in FIG. 5, clamp portion 38 is configured as a sloped surface and is positioned to force webbing portion 40 against engagement portion 42 when clamp member 24 is at the first operational position.

Exemplary embodiments include configurations that maintain the sandwiching force fixing webbing portion 40 between clamp portion 38 and engagement portion 42 even as contact surfaces wear. Normally, as contacting surfaces wear, the sandwiching force urging webbing portion 40 into engagement portion 42 is reduced. Because clamp portion 38 is configured with a low angle wedge surface, biasing member 26 will urge an unused or unworn surface of clamp portion 38 forcing it against webbing portion 40 into engagement portion 42 without reduction of the original sandwiching force. In alternative exemplary embodiments, clamp portion 38 and engagement portion 42 can include other configurations for retaining device 10 at a position placed along webbing 12 in the clamped condition. For example, housing 22 having a plurality of engagement portions 42 configured and positioned for retaining webbing portion 40 in the clamped condition. Whereas clamp member 24 can include a clamp portion 38 having at least one protrusion, with or without the sloped surface, configured and positioned for fixing device 10 at a position along the seat belt webbing portion. In another embodiment, clamp portion 38 or engagement portion 42 can be configured to include a treated or roughened surface to enhance retaining webbing portion 40 between clamp portion 38 and engagement portion 42 at the first operational position.

Figure 6:
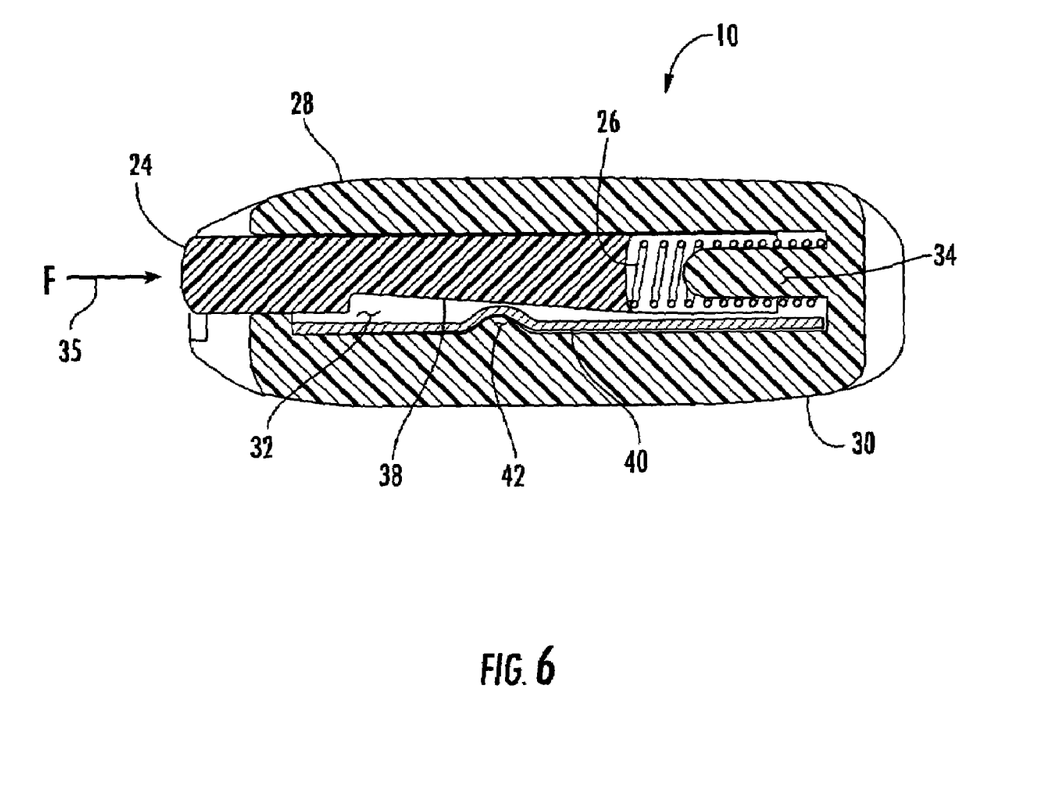
FIG. 6 is a cross-sectional view of a device constructed in accordance with an exemplary embodiment of the present invention illustrating another operating position.

An exemplary embodiment of device 10 in a second operational position is illustrated in FIG. 6. The second operational position occurs when the user places device 10 in an unclamped condition for slidably relocating device 10 to a different location along webbing 12. In the illustrated position, a force has been applied to move clamp member 24 in the direction of the arrow 35 wherein the configuration of clamp portion 38 allows webbing portion 40 to slide through the housing 22. Here clamp portion 38 is configured as a sloped surface and positioned so that clamp portion 38 moves away from webbing portion 40 when clamp member 24 is moved toward the second operational position. Once relocated the force exerted by clamp portion 38 is removed and the device is now capable of slidable movement along the seat belt webbing.

Figure 13:
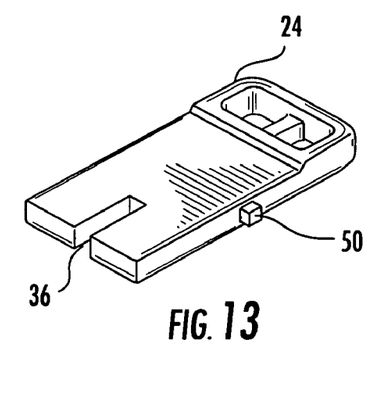
Figure 14:
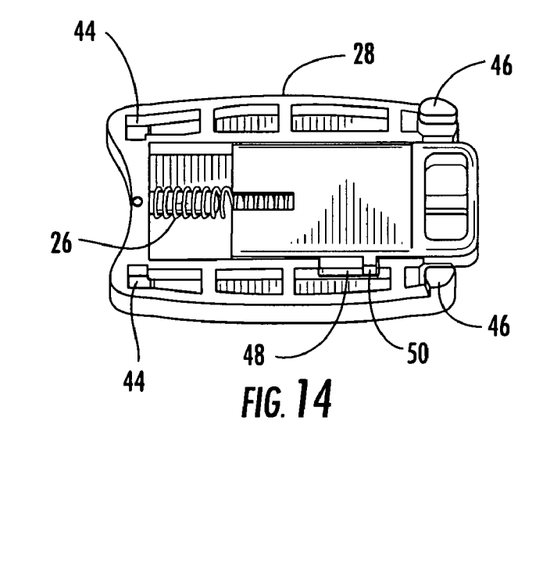

An alternative exemplary embodiment of device 10 includes a retaining feature for preventing the removal of clamp member 24 from receiving area 32 while device 10 is assembled on webbing 12. An example of this embodiment is illustrated in FIGS. 11–16. Here, an interior portion of upper housing 28 includes a slot or aperture 48. Clamp member 24 includes a protrusion or pin portion 50 as illustrated in FIG. 13. Aperture 48 and pin portion 50 are further configured to allow movement of clamp member 24 between the first operational position and the second operational position. As clamp member 24 moves between the first and second operational positions, pin portion 50 moves within aperture 48. Aperture or slot 48 and pin portion 50 are positioned and configured such that clamp member 24 is not capable of being pulled from housing 22 when device 10 is in the assembled condition, such as illustrated in FIGS. 14–16. Additionally, aperture 48 and pin portion 50 are positioned and configured to maintain the original sandwich or clamping force upon webbing portion 40 even as clamp surface 38 wears and moves to an unused surface as illustrated by the direction of the arrow 33 in FIG. 5. In addition, aperture or slot 48 and pin 50 are only positioned on one side thus this feature will prevent clamp member and its clamp surface from being improperly located in the housing (e.g., clamp surface always facing protrusion 42).

Figure 17:
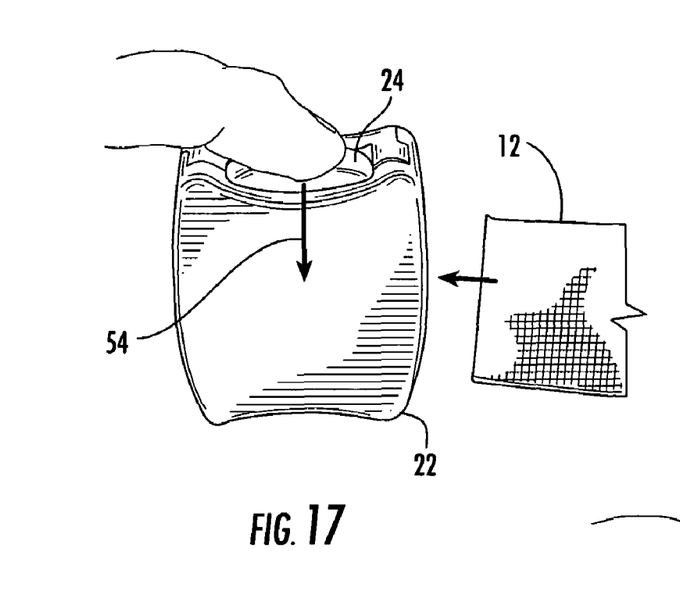
FIGS. 17–19 are views of a device being assembled to webbing constructed in accordance with an exemplary embodiment of the present invention.
Figure 18:
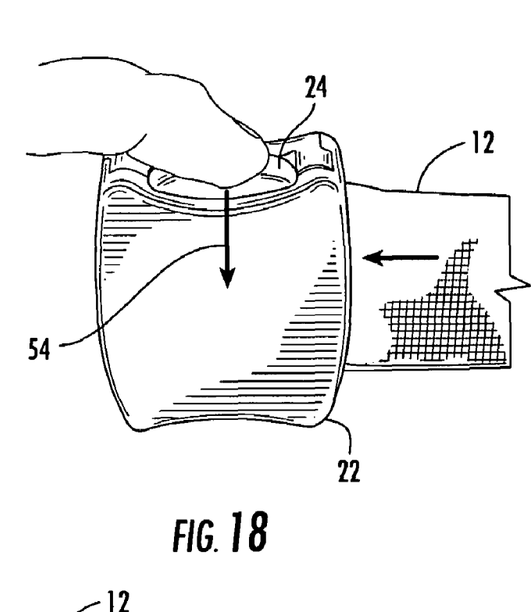
Figure 19:
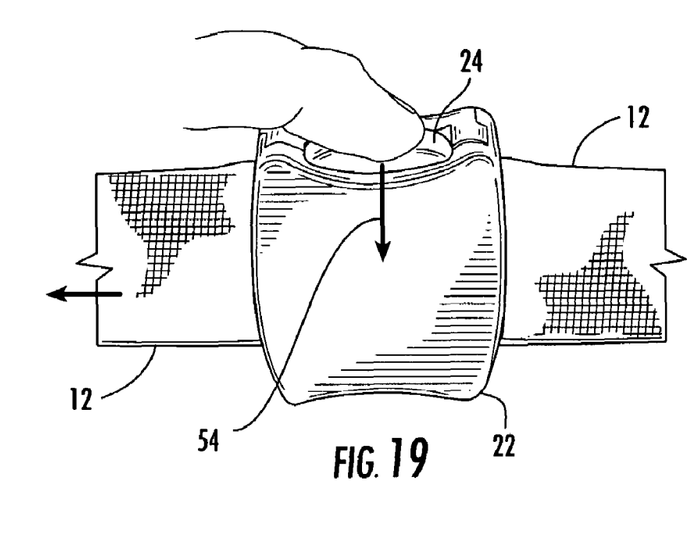

In an exemplary embodiment device 10 is assembled to webbing 12 as illustrated in FIGS. 17–19. After device 10 is assembled together, clamp member 24 is urged to the second operational position or the unclamped condition (illustrated with arrow 35). This is the same position of clamp member 24 as illustrated in FIG. 6, but without webbing portion 40. Then webbing 12 is slidably urged between clamp surface 24 and engagement portion 42 and through receiving area 32, as illustrated in FIGS. 18 and 19. This condition is also similar to that illustrated in FIG. 6.

Referring now to FIGS. 1 and 2, a user can relocate device 10 along webbing 12 to introduce looseness or slack in the section of webbing across the user's body. To use device 10 the user first secures the seat belt in a latched condition such as inserting a tongue, connected to webbing 12, into buckle 16. In a seat belt latched condition, a section of webbing 12 is drawn across a portion of the user's body with a certain amount of tension introduced by retractor 20. Device 10 is disposed at a position along that section of webbing (e.g. illustrated in FIG. 1). The user then pulls on the webbing to introduce slack into the webbing across the user's body. If device 10 is not in the unclamped condition, the user moves clamp member 24 to the second operational position. While maintaining the slack by holding webbing 12, the user then simply slides device 10 along webbing 12 to a position proximate mounting ring 14 and then places device 10 in the clamped condition. When the user releases webbing 12, retractor 20 will retract both webbing 12 and device 10 until device 10 abuts mounting ring 14, as illustrated in FIG. 2. When device 10 abuts mounting ring 14 the section of webbing 12 across the user's body will have the amount of slack set by the user. Optionally, the user can first move device 10 along webbing 12 in the unclamped condition to a position proximate mounting ring 14. Then introduce slack in webbing 12 as described above. And finally, reposition device 10 in the clamped condition on the webbing proximate the mounting ring. The above procedures can be repeated if the user desires more or less slack in the webbing across the user's body.

In exemplary embodiments, biasing member 26 is configured to have sufficient urging force wherein device 10 maintains its location on webbing 12 in the clamped condition while abutted to mounting ring 14, as illustrated in FIG. 2. Device 10 should maintain its clamped condition abutting mounting ring 14 without sliding along webbing 12 until clamp member 24 is moved toward the second operational position. While device 10 is configured to provide sufficient clamping force to maintain its clamped condition on webbing 12, it is also configured to not damage webbing 12. Furthermore, device 10 in a clamped condition abutted to mounting ring 14 with slack in webbing 12 will allow the user to lean forward or make other relatively close movements due to slack in webbing 12. Additionally, if retractor 20 has not locked webbing 12, the user can move, e.g. lean forward, and device 10 will move with webbing 12 away from the turning loop or mounting ring 14 and maintain its clamped position on webbing 12. When the user returns to their original seated position, device 10 will retract with webbing 12 until device 10 abuts mounting ring 14, and thereby maintain the previously set slack in the webbing across the user.

To exit the vehicle and stow the seat belt, the user moves clamp member 24 to the unclamped condition and slides device 10 away from mounting ring 14, a sufficient distance to allow the webbing 12 to retract in the normal manner for stowing the seat belt. Additionally, exemplary embodiments of device 10 include configurations where the user can encounter some frictional resistance between device 10 and webbing 12 while in the unclamped condition, yet still be capable of relocating device 10 on webbing 12. Device 10 can be comprised of components made from materials such as metal or plastic so long as device 10 functions as described in exemplary embodiments herein.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A seat belt device for adjusting the tension of a seat belt webbing drawn across a user's body when the seat belt is in a latched condition, the seat belt device comprising:

a housing defining a receiving area configured to slidably receive the seat belt webbing therethrough, the housing having a first housing portion and a second housing portion, the first housing portion having at least one protrusion to removably engage at least one aperture of the second housing portion in order to secure the first and second housing portions together and about the seat belt webbing;

a clamp member slidably mounted to the housing, the clamp member being configured for linear movement between a first position and a second position, the clamp member having a clamping surface, the clamiping surface of the clamp member urges a portion of the seat belt webbing against an engagement portion of the housing when the clamp member is in the first position clamping the device to the portion of the seat belt webbing, the engagement portion being included in the receiving area; and a biasing member being configured to urge the clamp member towards the first position and the engagement portion.

2. The seat belt device as in claim 1, wherein the at least one is a protrusion is configured to slidably engage the at least one aperture of the second housing portion in order to secure the first and second housing portions together.

3. The seat belt device as in claim 2, wherein the at least one protrusion is configured to snap fit into the aperture when the first and second housing portions are coupled together.

4. The seat belt device as in claim 1, wherein the clamp member further comprises a retention member depending away from a periphery of the clamp member wherein the retention member is configured for slidable movement within a slot of the housing, the retention member and the slot each being configured to prevent the clamp member from being completely removed from the housing.

5. The seat belt device as in claim 1, wherein the clamping surface defines an angular surface with respect to a direction of travel of the clamp member corresponding to movement from the first position to the second position and wherein the clamp member further comprises a feature for receiving and engaging the biasing member, wherein the housing is configured to have a recess configured to receive a portion of the feature when the clamp member is in the second position.

6. The seat belt device as in claim 5, wherein the clamp member further comprises a retention member depending away from the clamp member wherein the retention member is configured for slidable movement within a slot of the housing, the retention member and the slot each being configured to prevent the clamp member from being completely removed from the housing.

7. The seat belt device as in claim 6, wherein the angular surface is within a range of greater than 0 degrees and less than or equal to 4 degrees with respect to the direction of travel of the clamp member corresponding to movement from the first position to the second position.

8. The seat belt device as in claim 6, wherein the angular surface is positioned at approximately 3.5 degrees with respect to the direction of travel of the clamp member corresponding to movement from the first position to the second position.

9. The seat belt device as in claim 5, wherein a portion of the clamp member comprises a wedge shape, wherein the clamping surface is defined by at least one surface of the wedge shape.

10. The seat belt device as in claim 1, wherein the clamp member further comprises a retention member depending away from the clamp member, the retention member being configured for slidable movement within a slot of the housing, the retention member and the slot each being configured to prevent the clamp member from being completely removed from the housing and the engagement portion includes at least one protrusion configured to contact the webbing portion.

11. The seat belt device as in claim 1, wherein the biasing member is a spring and the clamp member further comprises a recess configured to receive and retain a portion of the biasing member and the housing further comprises a feature about which a portion of the biasing member is disposed and the recess is configured to receive a portion of the clamp member therein when the clamp member is in the second position and the clamp member further comprises a retention member depending away from the clamp member, the retention member being configured for slidable movement within a slot of the housing, the retention member and the slot each being configured to allow movement of the clamp member from the first position to the second position while also preventing the clamp member from being completely removed from the housing.

12. The seat belt device as in claim 1, wherein the clamp member further comprises an actuating portion, which depends away from the housing when the clamp member is in the first position and the biasing member is a spring and the clamp member further comprises a recess configured to receive and retain a portion of the biasing member and the housing further comprises a feature about which a portion of the biasing member is disposed.

13. The seat belt device as in claim 1, wherein the at least one feature is a leg portion configured to be releaseably engaged into a complimentary aperture of the second housing portion and the first housing portion and the second housing portion are capable of being secured about the seat belt webbing and to each other at the same time.

14. The seat belt device as in claim 13, wherein the first housing portion and the second housing portion are secured to each other by inserting the leg portion into the aperture and then sliding the first housing portion and the second housing portion with respect to each other until the leg portion engages a feature in the aperture thereby securing the first housing portion and the second housing portion together.

15. The seat belt device as in claim 1, wherein the clamping surface defines an angular surface with respect to a direction of travel of the clamp member corresponding to movement from the first position to the second position.

16. The seat belt device as in claim 15, wherein the clamp member further comprises a retention member, the retention member being configured for slidable movement within a slot of the housing, the retention member and the slot each being configured to allow movement of the clamp member from the first position to the second position while also preventing the clamp member from being completely removed from the housing.

17. The seat belt device as in claim 16, wherein the angular surface is within a range of greater than 0 degrees and less than or equal to 4 degrees with respect to the direction of travel of the clamp member corresponding to movement from the first position to the second position.

18. The seat belt device as in claim 14, wherein the clamp member further comprises an actuating portion, which depends away from the housing when the clamp member is in the first position and the biasing member is a spring and the clamp member further comprises a recess configured to receive and retain a portion of the biasing member and the housing further comprises a feature about which a portion of the biasing member is disposed.

19. A seat belt restraint system, comprising:
   a seat belt webbing secured to a seat belt retractor at one end and a seat belt buckle at the other end;
   a device for adjusting the tension of the seat belt webbing after it has been drawn across a user's body and secured to the seat belt buckle, the device comprising:
   a housing defining a receiving area configured to slidably receive the seat belt webbing therethrough;
   a clamp member slidably mounted to the housing, the clamp member being configured for movement between a first position and a second position, the clamp member having a clamping surface that urges a portion of the seat belt webbing against an engagement portion of the housing when the clamp member is in the first position, the engagement portion being included in the receiving area, the clamping surface having an angular surface with respect to a direction of travel of the clamp member, the direction of travel corresponding to movement of the clamp member between the first position and the second position and the clamp member further comprises a retention member depending away from the clamp member, the retention member being configured for slidable movement within a slot of the housing, the retention member and the slot each being configured to allow movement of the clamp member from the first position to the second position while also preventing the clamp member from being completely removed from the housing; and a biasing member being configured to urge the clamping surface toward the engagement portion.

20. The seat belt restraint system as in claim 19, wherein the housing comprises a pair of housing portions each being configured to be coupled together about the seat belt webbing at the same time to define the receiving area, each one of the pair of housing portions having at least one leg portion configured to be releaseably engaged in a complimentary aperture of the other one of the pair of housing portions.

21. The seat belt restraint system as in claim 20, wherein the pair of housing portions are secured to each other by inserting the leg portion into the aperture and then sliding the pair of housing portions with respect to each other until the leg portion engages a feature in the aperture thereby securing the pair of housing portions together.

22. The seat belt restraint system as in claim 19, wherein the angular surface is within a range of greater than 0 degrees and less than or equal to 4 degrees with respect to the direction of travel of the clamp member corresponding to movement from the first position to the second position.

23. The seat belt restraint system as in claim 19, wherein the clamp member further comprises an actuating portion, which depends away from the housing when the clamp member is in the first position and the biasing member is a spring and the clamp member further comprises a recess configured to receive and retain a portion of the biasing member and the housing further comprises a feature about which a portion of the biasing member is disposed.

24. The seat belt restraint system as in claim 19, wherein the seat belt restrain system further comprises a "D-ring" disposed about the seat belt webbing wherein the "D-ring" is configured to allow the seat belt webbing to slid therethrough and the "D-ring" is located between the seat belt retractor and the end secured to the seat belt buckle, wherein the device prevents a portion of the seat belt webbing from sliding through the "D-ring".

25. A method for providing an amount of slack in a seat belt webbing of a seat belt system, comprising:

introducing a desired amount of slack in the seat belt webbing;

positioning a device about the seat belt webbing proximate a guide member for the seat belt webbing, the guide member being configured to allow the seat belt webbing to slide therethrough and the guide member being fixedly secured in its location, wherein the device comprises a housing defining a receiving area configured to slidably receive the seat belt webbing therethrough; a clamp member slidably mounted to the housing, the clamp member being configured for movement between a first position and a second position, wherein a clamping surface of the clamp member urges a portion of the seat belt webbing against an engagement portion of the housing when the clamp member is in the first position, the engagement portion being included in the receiving area; and a biasing member being configured to urge the clamping surface toward the engagement portion; and clamping the device about the seat belt webbing proximate to the guide member wherein when the device prevents the webbing from passing through the guide member.

26. A device for adjusting a tension of a seat belt webbing after it has been drawn across a user's body and secured to a seat belt buckle, the device comprising:

a housing defining a receiving area configured to slidably receive the seat belt webbing therethrough, the housing having a first housing portion and a second housing portion, the first housing portion being removably secured to the second housing portion by a fastening means in order to secure the first and second housing portions together and about the seat belt webbing;

a clamp member slidably mounted to the housing, the clamp member being configured for movement between a first position and a second position, the clamp member having an angular clamping surface that urges a portion of the seat belt webbing against an engagement portion of tile housing when the clamp member is in the first position, the engagement portion being located in the receiving area; and a biasing member being configured to urge the clamping surface toward the engagement portion.

* * * * *